US011337131B1

(12) United States Patent
Parekh et al.

(10) Patent No.: US 11,337,131 B1
(45) Date of Patent: May 17, 2022

(54) METHOD AND APPARATUS FOR RECOMMENDING REAL-TIME HANDOVER TO A TARGET CELL IN OPEN-RADIO ACCESS NETWORK (O-RAN) ENVIRONMENT (71) Applicant: Sterlite Technologies Limited, Gurgaon (IN)

(72) Inventors: Shyam Parekh, Orinda, CA (US); Kevin Tang, Dublin, CA (US); Ravishankar Ravindran, San Ramon, CA (US)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/139,469

(22) Filed: Dec. 31, 2020

(51) Int. Cl.
*H04W 36/38* (2009.01)
*H04W 36/22* (2009.01)
*H04W 36/00* (2009.01)

(52) U.S. Cl.
CPC ....... *H04W 36/38* (2013.01); *H04W 36/0061* (2013.01); *H04W 36/00835* (2018.08); *H04W 36/00837* (2018.08); *H04W 36/22* (2013.01)

(58) Field of Classification Search
CPC .............. H04W 36/08; H04W 36/30; H04W 36/00837; H04W 36/00; H04W 36/00835; H04W 36/0085; H04W 36/305; H04W 36/0094; H04W 36/14
See application file for complete search history.

(56) References Cited

U.S. PATENT DOCUMENTS

| 8,160,024 B1* | 4/2012 | Ghaus | H04W 36/10 370/331 |
| 9,913,181 B1* | 3/2018 | Oroskar | H04W 24/10 |
| 10,091,698 B2* | 10/2018 | Xiao | H04W 36/0085 |
| 2003/0137953 A1* | 7/2003 | Chae | H04W 36/18 370/331 |
| 2016/0277977 A1* | 9/2016 | Wang | H04W 74/0833 |

FOREIGN PATENT DOCUMENTS

WO   WO-2021101355 A1 *  5/2021 ............ H04W 92/12

OTHER PUBLICATIONS

"O-RAN Use Cases and Deployment Scenarios", Feb. 2020 (Year: 2020).*

* cited by examiner

Primary Examiner — Dung Hong (57) ABSTRACT

A method and radio access network (RAN) controller (102) for providing real-time target cell recommendation for handover in an open-RAN (O-RAN) environment (400) is disclosed. The O-RAN environment has a virtualized network architecture having at least one RAN controller, the RAN controller is connected with a plurality of E2 nodes, the plurality of E2 nodes are connected to a plurality of user equipment (UEs) (112a, 112b, 112c, 112d and 112e) positioned in a serving cell (110) adjacent to a plurality of neighbour cells (108a,108b). The method comprising executing a first handover process to enable checking, at the atleast one UE, if triggering of handover is required and a second handover process to identify a target neighbour cell (108a/108b) for handover of the atleast one UE from the serving cell to the target neighbour cell and recommending the handover of the atleast one UE from the serving cell to the identified target neighbour cell based on the first handover process and the second handover process. The first handover process and the second handover process are triggered simultaneously.

20 Claims, 5 Drawing Sheets

METHOD AND APPARATUS FOR RECOMMENDING REAL-TIME HANDOVER TO A TARGET CELL IN OPEN-RADIO ACCESS NETWORK (O-RAN) ENVIRONMENT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to a wireless communication system, and more specifically relates to a method and apparatus for recommending real-time handover to a target cell in open-Radio Access Network (O-RAN) environment.

Description of the Related Art

As a location of a user equipment (UE) is moved from a service area defined by "X" cell into that defined by "Y" cell, the UE must disconnect with "X" base station and connect with "Y" base station (i.e., establish a new connection). This operation is sometimes known as handover (HO) or a cell reselection.

A network congestion is a growing problem for wireless network operators. For example, for some UEs, the cell offering the strongest radio reception may also be the most heavily loaded with other UEs who are currently being served. Handing over of still more UEs into that cell shall aggravate the congestion that may already exist. This may result in degraded quality of service, dropping of calls, denial of service, and the like. All of these may result in loss of revenue for the service provide.

Albeit the need of HO, the unnecessarily switching of the serving cell and in case of switching to a loaded cell, in both these cases, causes wastage of radio resources and decrease in system efficiency. Hence, in order to effectively manage the HO operation, it is vital to monitor and consider the parameters, including the variation therein, constituting the HO in consideration with load balancing of the cells. The parameters may include, but not limited to, signal strength (RSRP/RSRQ), cell load values, cell individual offsets (CIOs), hysteresis margins, and the like. Especially, considering the current expansion in the wireless communication networks are becoming increasingly complex and are in the process of having new standards and protocols (such as 5G standards), the judicious use of these parameters in order to effectively utilize the radio resources, is of utmost priority.

Accordingly, there is a need for a technique that improves and/or provides centralized HO management system by considering the variation in the HO parameters to effectively perform the HO.

BRIEF SUMMARY OF THE INVENTION

The principal objective of the present invention is to simultaneously detect handover requirement of a user equipment (UE) along with identification of a target neighbour cell for handover of the UE from a serving cell to the target neighbour cell.

Another objective of the present invention is to parallelly perform, on all the neighbour cells, the detection of the handover requirement of the UE along with the identification of the target neighbour cell for handover of the UE from the serving cell to the target neighbour cell.

Another objective of the present invention is to enable efficient utilization of cell load parameters for performing a real-time handover.

Another objective of the present invention is to select the target neighbour cell, for the HO of the UE, that ensures an optimum usage of resources in a radio access network while achieving the above objective.

Another objective of the present invention is to achieve improved load balancing across different cells in 4G/LTE and 5G networks, following the HO operation.

Accordingly, herein discloses a method for recommending a real-time handover in an open-Radio Access Network (O-RAN) environment. More particularly, the method comprising triggering a first handover process and a second handover process in parallel, where the first handover process is configured to enable a checking if triggering of handover is required and the second handover process is configured to identify a target neighbor cell for handover of the UE from the serving cell to the target neighbor cell. Furthermore, the method includes performing the handover of the UE from the serving cell to the identified target cell based on the first handover process and the second handover process, where both the first handover process and the second handover process are triggered simultaneously.

The first handover process comprises dynamically updating a first handover parameter of the serving cell with respect to a neighbor cell and a second handover parameter of the neighbor cell with respect to the serving cell, and transmitting the updated first handover parameter and the second handover parameter to the UE. The updated first handover parameter and the second handover parameter enables the UE to trigger the handover based on occurrence of an A3 event.

The first handover process comprises dynamically updating a first handover parameter of the serving cell and a second handover parameter of the neighbor cell and transmitting the updated first handover parameter and the second handover parameter to the UEs, wherein the updated first handover parameter and the second handover parameter are utilized at the UE to determine if an A3 event is triggered and if the handover is required by the UE. The first handover parameter is a first cell individual offset (CIO) value of the serving cell with respect to a neighbor cell and the second handover parameter is a second CIO of the neighbour cell with respect to the serving cell. The updated CIO values enable triggering of an A3 event at a UE, and identify handover trigger for the UE from the serving cell to each of the neighbor cell.

The second handover process comprises obtaining a plurality of cell parameters of the plurality of candidate cells, creating a compared list of the plurality of candidate cells by comparing the plurality of candidate cells based on the plurality of cell parameters and selecting a target cell from the compared list of the plurality of candidate cells as the target cell for the handover.

The second handover process comprises obtaining a plurality of cell parameters of the plurality of candidate cells, comparing the plurality of candidate cells based on the plurality of cell parameters and selecting a target cell in the compared list of the plurality of candidate cells as a target cell for the handover. The plurality of cell parameters comprises at least one of: reference signal received power (RSRP), reference signal received quality (RSRQ) and physical resource blocks (PRB) utilization value for each of the candidate cells.

The method further comprises obtaining at least one average load value corresponding to the serving cell and each neighbor cells from a radio network information base (RNIB) and determining if the average load value of the serving cell is greater than average load value of at least one neighbor cells. The RNIB stores load values of the serving cell and each of the neighbor cells.

The first handover process is repeated after a predefined time interval.

The second handover process is executed when an A3 event is triggered by a UE based on the first handover process.

The first handover process is executed when a load of the serving cell is greater than atleast one of a predefined threshold and a load of the neighbor cell.

The first handover process further comprising transmitting an input to the second handover process for ending the receiving of the plurality of cell parameters from the plurality of E2 nodes. The plurality of cell parameters includes at least one of: reference signal received power (RSRP) and reference signal received quality (RSRQ) for each of the candidate cells.

Accordingly, herein discloses an apparatus for performing a real-time handover in an open-Radio Access Network (O-RAN) environment. More particularly, Radio access network (RAN) controller, in open RAN (O-RAN) environment, for providing real-time handover trigger and target cell selection, the O-RAN environment has a virtualized network architecture having at least one RAN controller, the RAN controller is connected with a plurality of E2 node, the plurality of E2 nodes are connected with a plurality of user equipments (UEs) positioned in a serving cell, a cell covering a location for serving a UE, the serving cell is adjacent to a plurality of neighbour cells. The RAN controller is configured to trigger the first handover process and the second handover process in parallel, wherein the first handover process is configured to enable a checking, at the atleast one UE, if triggering of handover is required and wherein the second handover process is configured to identify a target neighbor cell for handover of the UE from the serving cell to the target neighbor cell. Furthermore, the RAN controller is configured to recommend the handover of the UE from the serving cell to the identified target cell based on the first handover process and the second handover process, wherein both the first handover process and the second handover process are triggered simultaneously.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modification.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Standard Networking Terms and Abbreviation:

RAN: A RAN may stand for radio access network. A radio access network (RAN) may be a part of a telecommunications system which may connect individual devices to other parts of a network through radio connections. A RAN may provide a connection of user equipment such as mobile phone or computer with the core network of the telecommunication systems. A RAN may be an essential part of access layer in the telecommunication systems which utilize base stations (such as e node B, g node B) for establishing radio connections.

Wireless communication system: A wireless communication system may consist of various network components connected via wireless networks. The wireless networks may comprise of any wireless connectivity technology such as radio links, millimeter wave, etc. In this document, the wireless communication system may include one or more controller connected with radio access networks, which are further connected with a plurality of user equipments.

New RAN: A Radio Access Network which can support either NR/E-UTRA or both and have capabilities to interface with Next Generation Core Network (NG-CN). NG-C/U is a Control/User Plane interface towards NG-CN.

gNB: New Radio (NR) Base stations which have capability to interface with 5G Core named as NG-CN over NG-C/U (NG2/NG3) interface as well as 4G Core known as Evolved Packet Core (EPC) over S1-C/U interface.

LTE eNB: An LTE eNB is evolved eNodeB that can support connectivity to EPC as well as NG-CN.

Non-standalone NR: It is a 5G Network deployment configuration, where a gNB needs an LTE eNodeB as an anchor for control plane connectivity to 4G EPC or LTE eNB as anchor for control plane connectivity to NG-CN.

Standalone NR: It is a 5G Network deployment configuration where gNB does not need any assistance for connectivity to core Network, it can connect by its own to NG-CN over NG2 and NG3 interfaces.

Non-standalone E-UTRA: It is a 5G Network deployment configuration where the LTE eNB requires a gNB as anchor for control plane connectivity to NG-CN.

Standalone E-UTRA: It is a typical 4G network deployment where a 4G LTE eNB connects to EPC.

Xn Interface: It is a logical interface which interconnects the New RAN nodes i.e. it interconnects gNB to gNB and LTE eNB to gNB and vice versa.

As per the O-RAN Alliance (O-RAN-WG1 OAM Architecture-v02.00), "the near real time RAN Intelligent Controller (near RT RIC) is a logical function that enables near-real-time control and optimization of O-RAN elements and resources via fine-grained data collection and actions over E2 interface. The Non-Real Time Radio Intelligent Controller (non RT RIC) is a logical function that enables non-real-time control and optimization of RAN elements and resources, AI/ML workflow including model training and updates, and policy based guidance of applications/features in near-RT RIC. It is a part of the Service Management & Orchestration Framework and communicates to the near-RT RIC using the A1 interface. Non-RT control functionality (>1 s) and near-Real Time (near-RT) control functions (<1 s) are decoupled in the RIC. Non-RT functions include service and policy management, RAN analytics and model-training for some of the near-RT RIC functionality, and non-RT RIC optimization. O-CU is O-RAN Central Unit, which is a logical node hosting RRC, SDAP and PDCP protocols. O-CU-CP is O-RAN Central Unit-Control Plane, which is a logical node hosting the RRC and the control plane part of the PDCP protocol. The O-CU-UP is O-RAN Central Unit-User Plane, which is a logical node hosting the user plane part of the PDCP protocol and the SDAP protocol. The O-DU is O-RAN Distributed Unit, which is a logical node hosting RLC/MAC/High-PHY layers based on a lower layer functional split. The O-RU is O-RAN Radio Unit, which is a logical node hosting Low-PHY layer and RF processing based on a lower layer functional split. This is similar to 3GPP's "TRP" or "RRH" but more specific in including the Low-PHY layer (FFT/iFFT, PRACH extraction). The O1 interface is an interface between management entities in Service Management and Orchestration Framework and O-RAN managed elements, for operation and management, by which FLAPS management, Software management, File management shall be achieved. The xAPP is an independent software plug-in to the Near-RT RIC platform to provide functional extensibility to the RAN by third parties." The near-RT RIC controller can be provided different functionalities by using programmable modules as xAPPs, from different operators and vendors.

In the following detailed description of embodiments of the invention, numerous specific details are set forth in order to provide a thorough understanding of the embodiment of invention. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 1 through 5, there are shown preferred embodiments.

Figure 1:
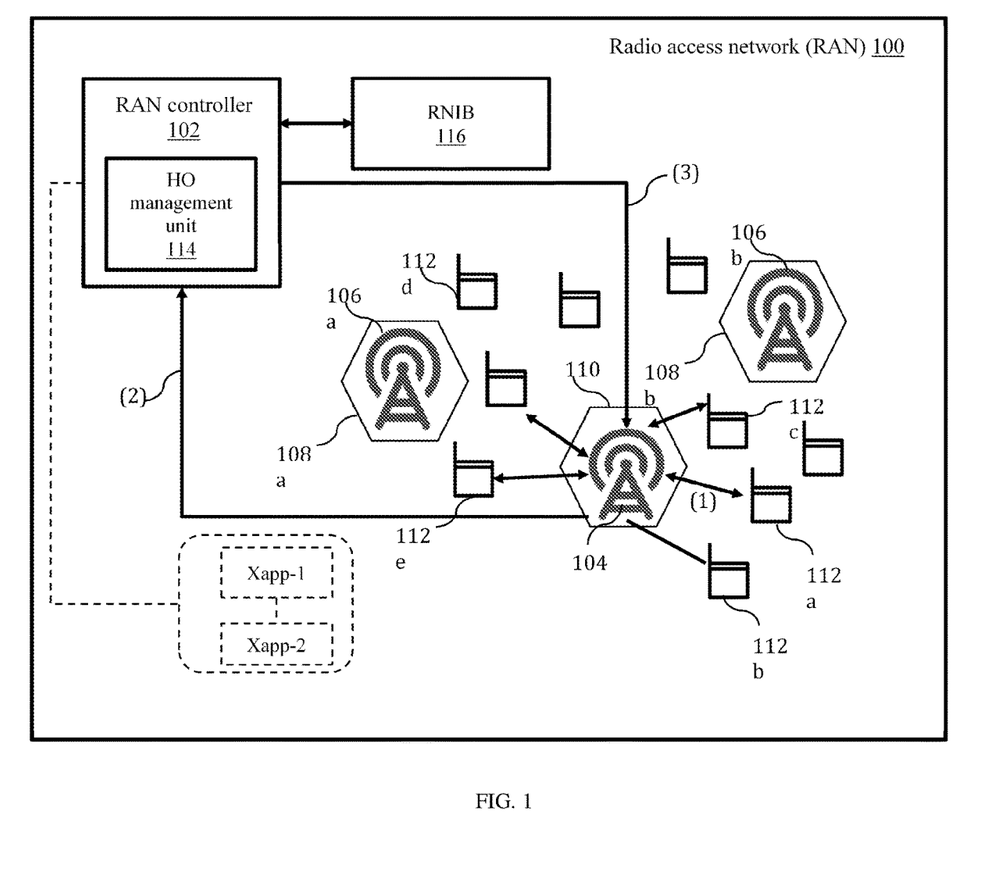
FIG. 1 illustrates an example radio access network (RAN).

FIG. 1 illustrates an example radio access network (RAN) (100) that comprises a plurality of user equipments (UEs) such as (112*a*, 112*b*, 112*c*, 112*d* and 112*e*) connected to a serving base station (104) position in a serving cell (110). Further, the RAN (100) comprises a plurality of neighbour base stations (106a and 106b) positioned in respective neighbour cells (108a and 108b). In one aspect of the invention, the RAN controller (102) may be positioned outside the RAN (100). The RAN controller (102) may control a plurality of RANs such as RAN (100). The position of the RAN controller may be inside the RAN (1000 in one such embodiment. XApp are applications at the RAN controller, which may be configured to perform various functions.

In some example, the RAN (100) comprises a RAN controller (102) and a radio network information base (RNIB) (116). The RAN (100), in one example, is implemented in a virtualized network architecture (such as for example, open-radio access network (O-RAN)) and comprises at least one RAN controller (102). The RAN controller (102) comprises a Handover (HO) management unit (114) configured to perform operations related to handover of the UEs (112a, 112b, 112c, 112d and 112e). In some example, the HO management unit (114) may be implemented via a virtualized application that is xApps i.e., xApp-1 and x-App-2 that are configured to virtually perform the operations of the RAN HO management unit (114).

The RAN controller (102) may be configured to communicate with a core network (not shown) comprising an evolved packet core (EPC) using an "51" interface. More particularly, the RAN controller (102) may communicate with the core network (not shown) comprising Mobility Management Entity (MME) and a User plane entity (UPE) identified as Serving Gateway (S-GW) using S1-C and S1-U for control plane and user plane, respectively. In one aspect of the invention, the RAN controller (102) may communicate with the 5G base core network.

All UEs (112a, 112b, 112c, 112d and 112e) periodically measure received signal strengths/qualities from all base stations (104, 106a and 106b) and construct signal strength/quality indicators such as reference signal received power (RSRP) and reference signal received quality (RSRQ) values as defined in the 3GPP standards. Then using the criteria as defined in the 3GPP standards, when an A3 event triggers, these measurement results are reported to the serving base station (104). The invention is not limited to the A3 event (for example, subscription of multiple events such as A1-A6 and the measurements and handover parameters defined therein. Any future 3GPP standards are expected to have equivalent handover events and equivalent measurements and parameters associated with such handover events. For those standards, when such equivalent events trigger, said equivalent measurements are reported (1). The measurements in the form of measurement reports (MRs).

Further, the MRs first sent (2) to the HO management unit (114) of the RAN controller (102). The HO management unit (114) then executes a real-time update of one or more cell parameters, such as cell individual offset (CIO) values, and enable checking of a handover trigger at atleast one UE and target cell selection, according to the proposed invention. The process of updating the one or more cell parameters and enabling the checking of handover trigger may utilized for performing handover trigger. Additionally, base station loads, in terms of number of UEs served, total computational, energy, memory, wireless resource usage levels of the base station, etc., are also made available, by the RAN controller (102), to the HO management unit (114). Further, for example, the HO parameters of each cell are also provided to the HO management unit (114). The HO parameters such as, for example, offset parameters (i.e., cell individual offset (CIO)), hysteresis margin parameter and time to trigger parameter defined therein, or equivalent parameters of future standards. In some example, the MRs may also include signal strength metrics that is RSRP and/or RSRQ values. In one example, the resource load metrics, old/existing CIO values, and the like, may be obtained from the RNIB (116). The RNIB (116) may be, in one example, a storage unit for old/existing/new CIOs and for the plurality of resource load metrics of the serving base station (104) and neighbour base stations (106a and 106b) communicated to the RAN controller using the E2 interface.

In some example, when the HO management unit (114) receives the MRs and/or HO parameters, it triggers a first HO process and a second HO process. The first HO process and second HO process are performed parallelly for the serving cell (110) with respect to all the neighbour cells (108a and 108b). In some example, the first HO process and second HO process is triggered simultaneously. In another example, the simultaneous triggering of the first HO process and the second HO process is executed in parallel. That is, multiple HO of the UEs can be recommended accurately in that the HO management unit (114) can be configured to perform parallelly the HO processes (first and second) for each serving cell (110) with respect to each of the neighbour cells (108a and 108b).

In an embodiment of the invention, the RAN controller is connected to a plurality of E2 nodes (such as CU, DU and RU). The E2 nodes are further connected to a plurality of user equipments (UEs). The RAN controller triggers a first handover process for dynamically updating the handover parameters, such as cell individual offset (CIO) values, of serving cell and each of the neighbor cells, with respect to each other. The dynamically updated CIO values are transmitted from the RAN controller to the plurality of UEs, via the E2 nodes. The E2 node may be an O-RAN node which is part of RAN and may be connected to the near-RT-RIC via an E2 interface. The E2 node may include a centralized unit (CU), a distributed unit (DU) and a radio unit (RU). The E2 nodes may connect with a plurality of UEs at one end and the near-RT-RIC at other end. The serving BS (106) may be the base station which is currently serving the UE. In another example, the serving BS may be the E2 node currently serving the UE.

The updated CIO values are utilized by the UEs to check if handover is required by the UE. The checking for triggering of handover requirement is initiated by checking a handover inequality, which checks if A3 event is triggered at the UE, based on the updated CIO values. The first handover process is configured to enable checking of handover requirement at the UE, based on updated handover parameters. The second handover process, which is triggered in parallel to the first handover process, compares the plurality of neighbour cells and identifies a target neighbor cell, which is best suited for handover. The parallel triggering of the first handover process and the second handover process may be executed using a plurality of parallel processing threads. The parallel processing threads may be implementing by executing each of the parallel threads at a same time. Upon identifying triggering of handover parameters, the RAN controller recommends a target neighbor cell for performing handover of UE from the serving cell to the identified target neighbor cell. In another aspect, the RAN controller may execute handover of the UE from the serving cell to the identified target cell. The serving cell may be the cell location which is currently serving the UE. The neighbor cells may be all the cells which are adjacent to the serving cell. The serving cell handover parameter may include serving cell CIO (cell individual offset) value with respect to a neighboring cell. The neighboring cell handover parameter for a neighboring cell may include neighboring cell CIO value with respect to the serving cell. The CIO value may be an offset value with the neighbor's measurement value, which may be used for taking handover related decisions. A negative CIO value of serving cell with respect to a neighbor cell may show that the neighbor cell has weaker possibility to provide HO (handover) with that neighbor cell. Similarly, a positive CIO value of the serving cell with respect to the neighbor cell may show that the neighbor cell has high possibility of handover with the neighbor cell.

In some example, UE (110) is configured to check if a predefined handover inequality is satisfied for a specific interval of time. The predefined handover inequality is RSRPt>RSRPs+(Hs−CIOs,t), where Hs is the hysteresis parameter for the serving cell (104), RSRPt is a received signal strength measure of the each neighbour cell (106a/106b . . . 106n), RSRPs is a received signal strength of the serving cell (104), CIOs,t is a cell individual offset measure of the serving cell (104) with respect to one of the neighbour cells (106a/106b . . . 106n). As per 3GPP ETSI TS 136 214 V9.1.0 (2010 April) technical specification, the RSRP may be defined as "Reference signal received power (RSRP), is defined as the linear average over the power contributions (in [W]) of the resource elements that carry cell-specific reference signals within the considered measurement frequency bandwidth." RSRP may be the power of the LTE Reference Signals spread over the full bandwidth and narrowband.

In some example, the HO management unit (406), in order to dynamically update the HO parameters, is configured to change a serving cell CIO with respect to each of a neighbour cell CIO and change the neighbour cell CIO with respect to the serving cell CIO.

In an aspect of the invention, each of the UE positioned in the serving cell has a plurality of neighbor cells surrounding the serving cell. Alternatively, the neighbor cells may be called candidate cells. In another embodiment, the second handover process is executed when a load of the serving cell is greater than a predefined threshold value.

The predefined threshold may be a resource load criterion indicating that the PRB utilization value of the serving cell (104). In some example, the PRB utilization values may be the radio resources utilized by a cell. The radio resource utilized by the cell may tell how much load is present in the cell. The PRB utilization values may signify the load parameters within the cell. The candidate cell BS (106b) may be the base station associated with the candidate cell. The candidate cell BS (106b) may be the E2 node associated with the candidate cell. The candidate cell may include all the cells neighbor to the serving cell, and may be used for identifying a target cell for handover of the UE from the serving cell to the target cell.

The base stations (104, 106a and 106b) (may include, for example, an access node such as e.g. a Radio Base Station (RBS), also referred to as e.g., evolved Node B ("eNB"), "eNodeB", "NodeB", "B node", gNB, or BTS (Base Transceiver Station), depending on the technology and terminology used. The base stations (104, 106a and 106b) may be a logical node that handles transmission and reception of signals associated with either the serving cell (110) or the neighbour cells (108a and 108b). The serving cell (110) and the neighbour cells (108a and 108b) may connect to each other via "Xn" interface. The base station (104) and the neighbour base stations (106a and 106b) may connect to one or more antennas, such as the antenna, thus respective base stations may be responsible for the serving cell (110) and the neighbour cells (108a and 108b). In some example, the base station (104) can be configured to broadcast the HO parameters or the updated HO parameters to the UEs (112a, 112b, 112c, 112d and 112e) served by the base station (104). The HO parameters, in one embodiment, may also be communicated to the neighbour base stations (106a and 106b) using the "Xn" interface.

The UEs (112a, 112b, 112c, 112d and 112e) may be the devices used to initiate a communication, such as a computer, a personal digital assistant (PDA), a laptop or electronic notebook, a cellular telephone, or any other device, component, element, or object capable of initiating voice, audio, video, media, or data exchanges within the RAN (100).

Figure 2:
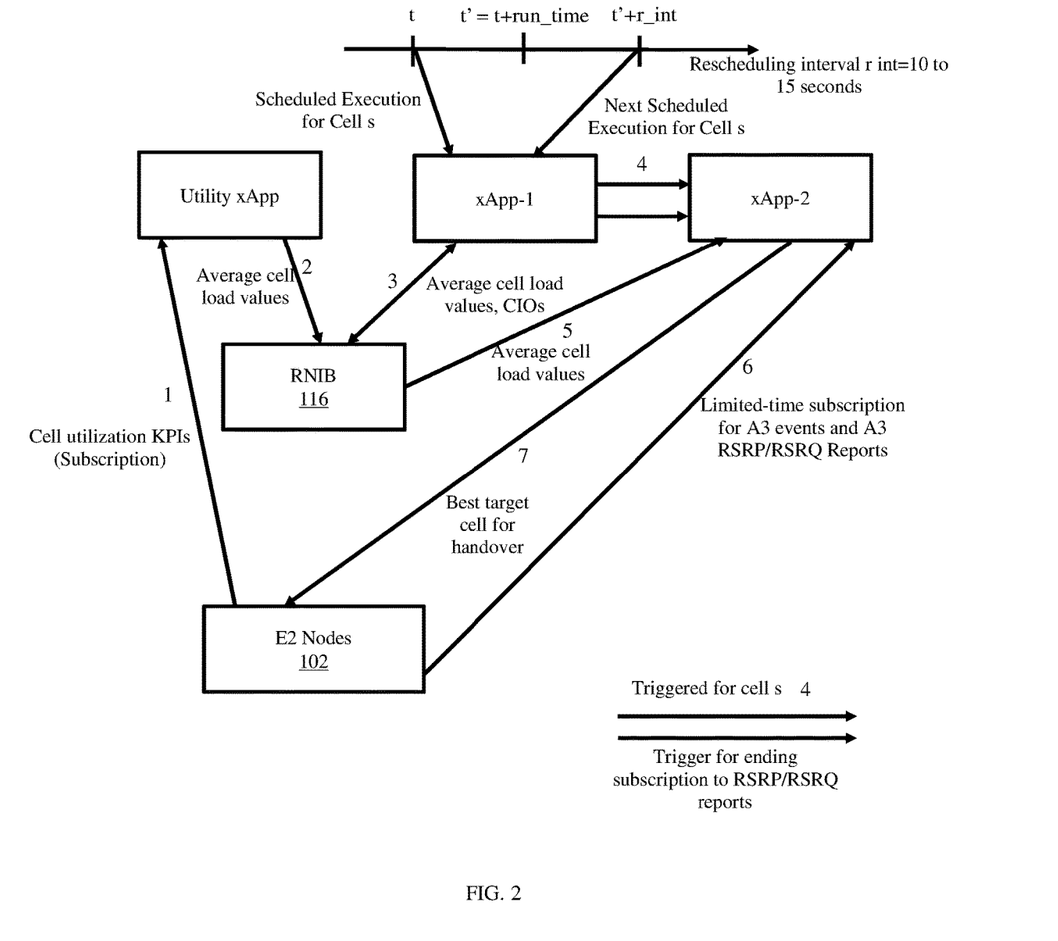
FIG. 2 illustrates a sequence diagram illustrating a method for performing real-time handover.

Referring to FIG. 2, the HO management unit (114), herein is implemented via xApp-1 and x-App-2. That is, the xApp-1 and x-App-2 may be enabled to perform the operations (virtually) of the first handover process (xApp-1) and the second handover process (xApp-2). Unlike conventional mechanism, the proposed HO management unit (114) can be configured to execute two processing threads, each of the two processing threads is executed in parallel. The parallel execution is performed by simultaneous triggering of the two processing threads, a first processing thread of the two-processing thread is associated with the first handover process and a second processing thread of the two-processing thread is associated with a second handover process. The HO management unit (114) may also be configured to obtain data associated with each cell and with applications executed at the UEs (112a, 112b, 112c, 112d and 112e) virtually implemented using a utility xApp.

The HO management unit (114), using a utility xApp, may be configured to receive, at step 1, a cell utilization key performance indicator (KPIs) from the serving cell (110) and the neighbour cells (108a and 108b). In one example, the KPIs indicate current radio resource utilization. At step 2, the RNIB (116) may be configured to receive the average cell load values for the serving cell (110) and the neighbour cells (108a and 108b) as estimated by the utility xApp as well as the existing CIO values (first CIO metrics).

Further, at step 3, xApp-1 in the HO management unit (114) can be configured to obtain the computed average cell load values along with the first CIO metrics from the RNIB (116). The HO management unit (114) (xApp-1) may then be configured, at step 4, to determine the second CIO metrics, as detailed below, when the condition of the cell load performance indicator is met. The second CIO metrics are then sent to the RNIB (116). for future reference or use, and to at least one UE (112a, 112b, 112c, 112d and 112e). The second CIO metrics are used by the UEs for determination of triggering of the A3 event for handover.

The HO management unit (114) (xApp-1) may be further configured to, at step 4, initiate or end subscription of measurements corresponding to signal strength metrics, using an xApp, such as xApp 2. In an aspect of the invention, the xApp 1 and xApp 2 are shown for reference. The RAN controller may have a plurality of xApps such as xApp 1 and xApp 2. Hence, the HO management unit (114) (xApp-1) may be configured to update the cell parameters that can trigger a handover and enable a checking if the triggering of handover is required or not.

Further, the HO management unit (114) (xApp-2) is configured to perform the cell selection i.e., identification of the target neighbour cell (108a or 108b) for handover of the at least one UE (112a, 112b, 112c, 112d and 112e) from the serving cell (110). That is, to perform the cell selection, the HO management unit (114) (xApp-2) can be configured to obtain, at step 5, average load values from the RNIB (116) and further to obtain, at step 6, limited-time subscription for "A3" events and A3 RSRP/RSRQ reports.

Once the neighbour (candidate) cell is selected (for example, candidate cell (108a)), the information (such as cell-ID) of the candidate cell (108a) may be reported, at step 7, to the serving base station (104) using the E2 interface.

Thus, the present invention enables parallel execution of xApp-1 and xApp-2 (first and second HO process) for implementing mobile load balancing (MLB), using separate thread for each cell for handover parameters and further for the target cell identification using sorting of all candidate cells. Thereby, ensuring optimum load management in each radio access network using the HO processes.

Figure 3:
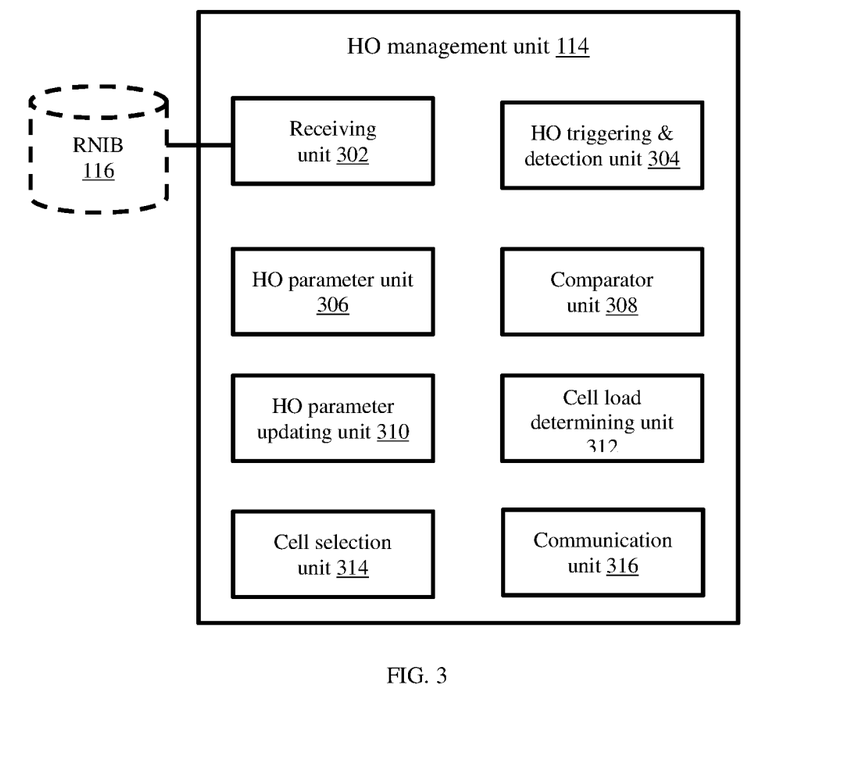
FIG. 3 illustrates various hardware elements in a handover (HO) management unit.

Referring to FIG. 3, the HO management unit (114) includes a receiving unit (302), a HO triggering and detection unit (304), a HO parameter unit (306), a comparator unit (308), a HO parameter updating unit (310), a cell load determining unit (312), a cell selection unit (314) and a communication unit (316).

The communication unit (316) (may also be referred to as "communicator). The communication unit (316) may include a transmitter (not shown) and a receiver (not shown), an interface component(s) supporting plurality of interfaces (such as "A1","O1", and any other supporting interface, represented as dotted lines in the FIG. 4). The communication unit (316) may be implemented, for example, in form of software layers that may be executed on a cloud computing platforms/system. The communication unit (316) may be configured to receive measurement reports (MRs), resource load metrics, old/new CIO values, and the like, from the RAN (100).

The receiving unit (302), may be configured to obtain the resource load metrics for each cell and first cell individual offset (CIO) metrics associated with each serving cell (110) with respect to each neighbour cell (108a-b). The first CIO metrics are referred to the CIO values that are currently available/stored in the RNIB (116).

The HO triggering and detection unit (304) can be configured to trigger the first handover process and the second handover process in parallel. The first handover process is configured to update the cell parameters that can trigger a handover, and the second handover process is configured to identify the target neighbour cell (108a/108b) for handover of the at least one UE (112a, 112b, 112c, 112d and 112e) from the serving cell (110) to the target neighbour cell (108a/108b). The first handover process may further enable a checking if triggering of handover is required.

Once, an A3 event is triggered by a UE, the HO triggering and detection unit (304) can be configured to determine if the triggering of handover is required. In case if the triggering of handover is required, then the cell selection unit (314) can be configured to identify the target neighbour cell (108a/1008b) for handover of the at least one UE (112a, 112b, 112c, 112d and 112e) from the serving cell (110) to the target neighbour cell (108a/108b).

In some example, as detailed in FIG. 2, both the first handover process (xApp-1) and the second handover process (xApp-2) are triggered simultaneously or executed in parallel.

In some example, the first HO process requires the HO parameter unit (306) to dynamically update the first handover parameter of the serving cell (110) with respect to each of a plurality of neighbor cells, and a second handover parameter for each of the plurality of neighbour cell (108a, 108b) with respect to the serving cell. In an aspect of the invention, the updated first handover parameter and the second handover parameter are utilized by a plurality of UE in a serving cell, for determining if the handover is to be triggered, by checking if an A3 event is triggered at the plurality of UE. The first handover process may determine if the triggering of handover is required. Further, the communication unit (316) can be configured to transmit the updated first handover parameter and the second handover parameter to the at least one UE (112a, 112b, 112c, 112d and 112e). In some example, the first handover process is repeated after a predefined time interval i.e., as detailed in FIG. 2.

In some example, the updated first handover parameter and the second handover parameter enables the at least one UE (112a, 112b, 112c, 112d and 112e) to trigger the handover based on occurrence of the A3 event. In some example, the first handover parameter is a first cell individual offset (CIO) value of the serving cell (110) with respect to each of the neighbor cell, and the second handover parameter is a second CIO for each of neighbour cell (108a, 108b) with respect to the serving cell. The CIO values are used by at least one UE (112a, 112b, 112c, 112d and 112e) in determining occurrence of an A3 event for handover from the serving cell (110) to each of the plurality of neighbour cell (108a, 108b) and vice versa.

In some example, the second HO process requires, the receiving unit (302) to obtain a plurality of cell parameters of the plurality of candidate cells. In some example, the plurality of cell parameters comprises at least one of: reference signal received power (RSRP), reference signal received quality (RSRQ) and physical resource blocks (PRB) utilization value for each of the plurality of candidate cells (108a, 108b). Further, the comparator unit (308) can be configured to compare the plurality of candidate cells (108a, 108b) based on the plurality of cell parameters. Further, the cell selection unit (314) can be configured to create a compared list (using the output obtained from the comparator unit (308)) of the plurality of candidate cells (108a, 108b) and select a target cell (e.g., 108a/108b) in the compared list of the plurality of candidate cells (108a, 108b) as the target cell for the handover.

In some other example, the second HO process requires, the receiving unit (302) to obtain plurality of cell parameters of the plurality of candidate cells. In some example, the plurality of cell parameters comprises at least one of: reference signal received power (RSRP), reference signal received quality (RSRQ) and physical resource blocks (PRB) utilization value for each of the candidate cells (108a, 108b). Further, the comparator unit (308) can be configured to compare the plurality of candidate cells (108a, 108b) based on the plurality of cell parameters. Further, the cell selection unit (314) can be configured to select the target cell (e.g., 108a/108b) among the compared plurality (e.g., within the compared list) of candidate cells (108a, 108b) as the target cell for the handover.

In some example, the cell load determining unit (312) can be configured to determine if the average load value of the serving cell (110) is greater than atleast one of a predefined threshold, and an average load value of at least one neighbour cells (108a, 108b). In another example, the cell load determining unit (312) can be configured to determine if the average load value of the serving cell (110) is greater than atleast one of a predefined threshold, and an average load value of at least one neighbour cells (108a, 108b) by a specified margin. In case, the average load value of the serving cell (110) is greater than atleast one of a predefined threshold, and an average load value of at least one neighbour cells (108a, 108b) by a specified margin, the second handover process is executed by the HO triggering and detection unit (304). In some example, the second handover process is executed on receiving an A3 event indication from a UE.

In some example, the indication of the end of the first handover process is communicated or transmitted, using the communication unit (316), as an input to the second handover process. This is mainly to terminate (end) the receiving of the plurality of cell parameters from the E2 nodes, as detailed at steps 5-7 in FIG. 2.

The components of the RAN controller (102) may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 4:
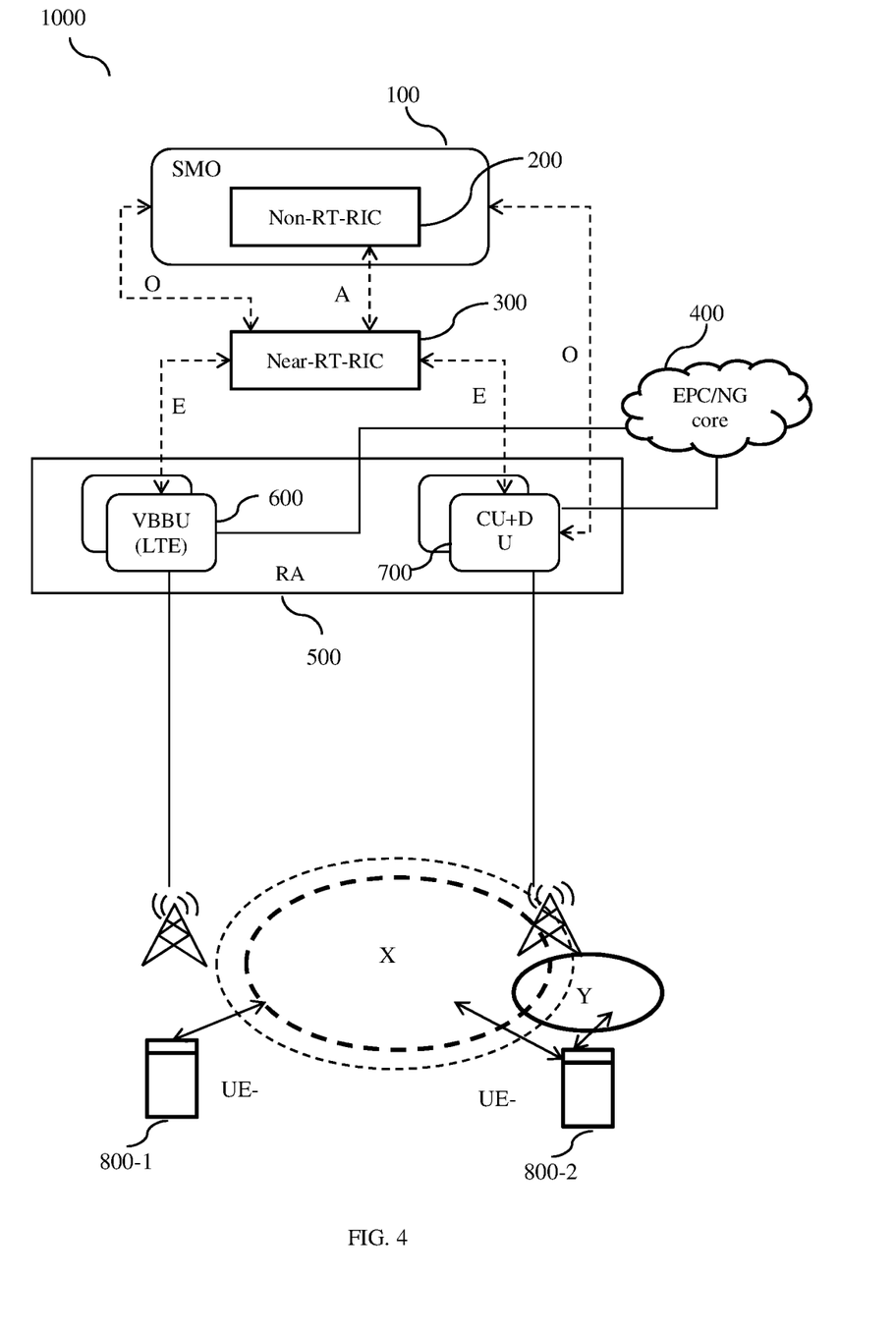
FIG. 4 illustrates an Open-Radio access network (O-RAN) architecture.

Referring to FIG. 4 in conjunction with FIG. 1, an Open-Radio Access Network (O-RAN) architecture (400) includes a Service Management and Orchestration (SMO) framework (402) and a radio access network (RAN) intelligent controller (RIC) (408) connected to the RAN (100). The SMO (402) is configured to provide SMO functions/services such as data collection and provisioning services of the RAN (100). The RAN (100), herein, is implemented in the O-RAN computing architecture (400). The RAN (100) may implement a single radio access technology (RAT) (4G/5G) or multiple RATs (4G and 5G) using the base stations (104, 106a, 106b, 106c . . . 106n) located in the RAN (100). The data collection of the SMO framework (402) may include, for example, data related to a bandwidth of a wireless communication network and the at least one UE (112a, 112b, 112c, 112d and 112e). The O-RAN is an evolved version of prior radio access networks, makes the prior radio access networks more open and smarter than previous generations. The O-RAN provides real-time analytics that drive embedded machine learning systems and artificial intelligence back end modules to empower network intelligence. Further, the O-RAN includes virtualized network elements with open and standardized interfaces. The open interfaces are essential to enable smaller vendors and operators to quickly introduce their own services, or enables operators to customize the network to suit their own unique needs. Open interfaces also enable multivendor deployments, enabling a more competitive and vibrant supplier ecosystem. Similarly, open source software and hardware reference designs enable faster, more democratic and permission-less innovation. Further, the O-RAN introduces a self-driving network by utilizing new learning based technologies to automate operational network functions. These learning based technologies make the O-RAN intelligent. Embedded intelligence, applied at both component and network levels, enables dynamic local radio resource allocation and optimizes network wide efficiency. In combination with O-RAN's open interfaces, AI-optimized closed-loop automation is a new era for network operations.

The SMO (202) is configured to provide SMO functions/services such as data collection and provisioning services of the RAN (208). As per O-RAN Alliance (O-RAN-WG1 OAM Architecture-v02.00), the SMO can be defined as "Service Management and Orchestration Framework is responsible for the management and orchestration of the managed elements under its span of control. The framework can for example be a third-party Network Management System (NMS) or orchestration platform. Service Management and Orchestration Framework must provide an integration fabric and data services for the managed functions. The integration fabric enables interoperation and communication between managed functions within the O-RAN domain. Data services provide efficient data collection, storage and movement capabilities for the managed functions. In order to implement multiple OAM architecture options together with RAN service modeling, the modeling of different OAM deployment options and OAM services (integration fabric etc.) must be supported by SMO".

The base stations (104, 106a, 106b, 106c . . . 106n) may be for e.g. a Radio Base Station (RBS), also referred to as e.g., evolved Node B ("eNB"), "eNodeB", "NodeB", "B node", gNB, or BTS (Base Transceiver Station), depending on the technology and terminology used. In some example, the base stations (104, 106a, 106b, 106c . . . 106n) may be a logical node that handles transmission and reception of signals associated with the plurality of cells. The base station (104) may connect to each other i.e., with the neighbour base stations (106a, 106b . . . 106n) via "Xn" interface either in a same network or to a network node of another network (intra-network). Each base station (104, 106a, 106b, 106c . . . 106n) may connect to one or more antennas.

Referring back to FIG. 4, the RIC (408) can be a non-real-time-radio intelligent controller (Non-RT-RIC) (404) and a near-real-time-radio intelligent controller (Near-RT-RIC) (406). The Non-RT-RIC (404) may be configured to support intelligent RAN optimization in non-real-time. Further, the Non-RT-RIC (404) can be configured to leverage the SMO services and may be a part of the SMO (402). One such advantage of configuring the RAN (100) within the O-RAN computing environment and/or O-RAN architecture (400) is leveraging the intellectualization ("Artificial intelligence (AI)/Machine Learning (ML)) of the Non-RT-RIC (404) and the Near-RT-RIC (406).

The Near-RT-RIC (406) may host plurality of xApps, for example, target cell selection-xApp-2 that is configured to select a best candidate cell i.e., target cell, from a plurality of candidate cells for performing the handover and xApp-1 for determining the handover requirement, as detailed in the present invention. The xApps (at the Near-RT-RIC (406)) uses an "E2" interface to collect near real-time RAN (100) information and to provide value added services using these primitives, guided by the policies/configuration and the enrichment data provided by the "A1" interface from the rApps at the Non-RT-RIC (404). An "O1" interface collects data for training in the Non-RT RIC (404) (integrated with SMO (402). The A1 interface may be defined as an interface between non-RT RIC and Near-RT RIC to enable policy-driven guidance of Near-RT RIC applications/functions, and support AI/ML workflow. The data packets which are communicated over the A1 interface may be called A1 messages. The E2 interface may be defined as an interface connecting the Near-RT RIC and one or more O-CU-CPs, one or more O-CU-UPs, and one or more O-DUs. The data packets which are communicated over E2 interface may be called E2 messages.

In one example, the "E2" and "A1" interface may be used to exchange control messages, subscription messages (i.e., subscription to RSRP/RSRQ reports and Limited-time subscription for A3 events and A3 RSRP/RSRQ Reports, as detailed in FIG. 2), real-time measurements, policy trigger messages, indication messages, machine learning (ML)

management and enrichment information types of messages, and the like. The real-time measurements comprising RSRP/RSRQ measurements, channel quality measurements and the like. The subscription messages such as, for example, limited-time RSRP/RSRQ subscription messages, limited-time A3 events subscription messages, and the like. The policy trigger messages, for example, include spectrum allocation policies, radio assignment policies, and the like. The O-RAN architecture (400) comprises a virtualized network architecture having at least one RAN controller (102) that is configured to perform the operations as detailed above.

Figure 5:
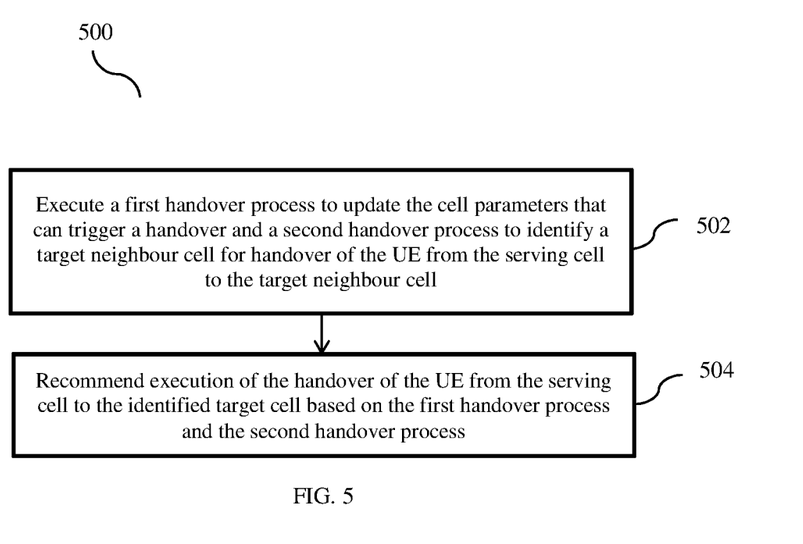
FIG. 5 is a flow chart illustrating a method for executing a real-time handover. The operations are performed by the HO management unit.

Referring to FIG. 5 that illustrates a flow chart (500) for performing real-time handover. The operations (502-504) are performed by the RAN controller (102).

At S502, the method includes executing the first handover process to update the cell parameters that can trigger a handover, and the second handover process to identify the target neighbour cell (108a/108b) for handover of the at least one UE (112a, 112b, 112c, 112d and 112e) from the serving cell (110) to the target neighbour cell (108a/108b).

At S504, the method includes recommending the execution of handover of the at least one UE (112a, 112b, 112c, 112d and 112e) from the serving cell (110) to the target neighbour cell (108a/108b) based on the first handover process and the second handover process.

Hence, the present invention aims at providing recommendation of the real-time handover based on the real-time monitoring and considering the cell load values and adjusting the CIO values accordingly in a cyclic manner. The present invention may perform execution of first handover process and the second handover process in real time using a plurality of parallel processing threads. The first handover process updates the handover parameters (first handover parameter and second handover parameters) which are shared with an UE for checking if the handover process is to be triggered. The triggering of handover process may be identified by checking if an A3 event is triggered at the UE based on the updated handover parameters. The second handover process performs identification of the target neighbor cell for handover of the UE. If the checking results in handover process to be triggered, the triggering of handover process is followed by recommending execution of the handover of the UE from the serving cell to the identified target cell. In another aspect, the triggering of handover may be followed by performing handover of the UE from the serving cell to the identified target neighbor cell.

The various actions, acts, blocks, steps, or the like in the flow chart (500) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware.

The results of the disclosed methods may be stored in any type of computer data repository, such as relational databases and flat file systems that use volatile and/or non-volatile memory (e.g., magnetic disk storage, optical storage, EEPROM and/or solid-state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for providing real-time target cell recommendation for handover by a Radio access network (RAN) controller in open RAN (O-RAN) environment, the O-RAN environment has a virtualized network architecture having at least one RAN controller, the RAN controller is connected with a plurality of E2 nodes, the plurality of E2 nodes are connected with at least one user equipments (UEs) positioned in a serving cell, a cell covering a location for serving a UE, the serving cell is adjacent to a plurality of neighbour cells, the method comprising:
   executing a first handover process and a second handover process in parallel,
   wherein the first handover process is configured to enable checking, at the at least one UE, if triggering of handover is required,
   wherein the second handover process is configured to identify a target neighbour cell, from the plurality of neighbour cells, for handover of the at least one UE from the serving cell to the target neighbour cell; and
   recommending the handover of the at least one UE from the serving cell to the identified target neighbour cell based on the first handover process and the second handover process, wherein both the first handover process and the second handover process are triggered simultaneously.

2. The method as claimed in claim 1, wherein the first handover process comprises:
   dynamically updating a first handover parameter of the serving cell and a second handover parameter of each of the neighbour cell; and
   transmitting the updated first handover parameter and the second handover parameter to the at least one UE, via the plurality of E2 nodes, wherein the updated first handover parameter and the second handover parameter enables the UE to trigger the handover based on occurrence of an A3 event.

3. The method as claimed in claim 1, wherein the first handover process comprises:
   dynamically updating a first handover parameter of the serving cell and a second handover parameter of each of the neighbour cell; and
   transmitting the updated first handover parameter and the second handover parameter to the at least one UE, via the plurality of E2 nodes, wherein the updated first handover parameter and the second handover parameter enables the UE to trigger the handover based on occurrence of an A3 event,
   wherein the first handover parameter is a first cell individual offset (CIO) value of the serving cell with respect to each of the neighbor cells, and the second handover parameter is a second CIO of each of the neighbour cells with respect to the serving cell, and
   wherein a CIO value is used for determining handover trigger at the UE from the serving cell to any of the plurality of neighbour cells.

4. The method as claimed in claim 1, wherein the second handover process comprises:
   obtaining a plurality of cell parameters of the plurality of neighbour cells, wherein the plurality of neighbour cells is a plurality of candidate cells;
   creating a compared list of the plurality of candidate cells by comparing the plurality of candidate cells based on the plurality of cell parameters; and selecting the target neighbour cell in the compared list of the plurality of candidate cells as the target cell for the handover.

5. The method as claimed in claim 1, wherein the second handover process comprises:
obtaining a plurality of cell parameters of the plurality of candidate cells;
comparing the plurality of candidate cells based on the plurality of cell parameters;
selecting the target neighbour cell in the compared list of the plurality of candidate cells as the target cell for the handover,
wherein the plurality of cell parameters comprises at least one of: reference signal received power (RSRP), reference signal received quality (RSRQ) and physical resource blocks (PRB) utilization value for each of the plurality of candidate cells.

6. The method as claimed in claim 1, wherein the method further comprises:
obtaining at least one average load value corresponding to the serving cell and each of the plurality of neighbour cells from a radio network information base (RNIB), wherein the RNIB stores load values of the serving cell and each of the plurality of neighbour cells; and
determining if the average load value of the serving cell is greater than average load value of at least one neighbour cell.

7. The method as claimed in claim 1, wherein the first handover process is repeated after a predefined time interval.

8. The method as claimed in claim 1, wherein the second handover process is executed when an indication for an A3 event from a UE positioned in the serving cell is identified.

9. The method as claimed in claim 1, wherein the second handover process is executed when a load of the serving cell is greater than at least one of a predefined threshold and a load of the neighbor cell from the plurality of candidate cells.

10. The method as claimed in claim 1, wherein the first handover process further comprising:
transmitting an input to the second handover process for ending the receiving of the plurality of cell parameters from the E2 nodes,
wherein the plurality of cell parameters includes at least one of: reference signal received power (RSRP) and reference signal received quality (RSRQ) for each of the plurality of candidate cells.

11. A radio access network (RAN) controller, in open RAN (O-RAN) environment, for providing real-time target cell recommendation for handover, the O-RAN environment has a virtualized network architecture having at least one RAN controller, the RAN controller is connected with a plurality of E2 nodes, the plurality of E2 nodes are connected with at least one user equipments (UEs) positioned in a serving cell, a cell covering a location for serving a UE, the serving cell is adjacent to a plurality of neighbour cells, the RAN controller is configured to:
execute a first handover process and a second handover process in parallel, wherein the first handover process is configured to enable a checking, at the at least one UE, if triggering of handover is required and wherein the second handover process is configured to identify a target neighbour cell for handover of the at least one UE from the serving cell to the target neighbour cell; and recommend the handover of the at least one UE from the serving cell to the identified target neighbour cell based on the first handover process and the second handover process, wherein both the first handover process and the second handover process are triggered simultaneously.

12. The RAN controller as claimed in claim 11, wherein the first handover process comprises: dynamically updating a first handover parameter of the serving cell and a second handover parameter of each of the neighbour cell; and transmitting the updated first handover parameter and the second handover parameter to the at least one UE, via the plurality of E2 nodes, wherein the updated first handover parameter and the second handover parameter enables the UE to trigger the handover based on occurrence of an A3 event.

13. The RAN controller as claimed in claim 11, wherein the first handover process comprises:
dynamically updating a first handover parameter of the serving cell and a second handover parameter of each of the neighbour cell; and
transmitting the updated first handover parameter and the second handover parameter to the at least one UE, via the E2 nodes,
wherein the updated first handover parameter and the second handover parameter enables the UE to trigger the handover based on occurrence of an A3 event;
wherein the first handover parameter is a first cell individual offset (CIO) value of the serving cell with respect to each of the neighbor cells, and the second handover parameter is a second CIO of each of the neighbour cells with respect to the serving cell, and wherein a CIO value is used for determining handover trigger at the UE from the serving cell to each of the plurality of neighbour cells.

14. The RAN controller as claimed in claim 11, wherein the second handover process comprises:
obtaining a plurality of cell parameters of the plurality of neighbour cells, wherein the plurality of neighbour cells is a plurality of candidate cells;
creating a compared list of the plurality of candidate cells by comparing the plurality of candidate cells based on the plurality of cell parameters; and
selecting the target neighbour cell in the compared list of the plurality of candidate cells as the target cell for the handover.

15. The RAN controller as claimed in claim 11, wherein the second handover process comprises:
obtaining a plurality of cell parameters of the plurality of candidate cells;
comparing the plurality of candidate cells based on the plurality of cell parameters;
selecting the target neighbour cell in the compared list of the plurality of candidate cells as the target cell for the handover,
wherein the plurality of cell parameters comprises at least one of: reference signal received power (RSRP), reference signal received quality (RSRQ) and physical resource blocks (PRB) utilization value for each of the plurality of candidate cells.

16. The RAN controller as claimed in claim 11, wherein the RAN controller is further configured to:
obtain at least one average load value corresponding to the serving cell and each of the plurality of neighbour cells from a radio network information base (RNIB), wherein the RNIB stores load values of the serving cell and each of the plurality of neighbour cells; and
determine if the average load value of the serving cell is greater than average load value of at least one neighbor cells.

17. The RAN controller as claimed in claim 11, wherein the first handover process is repeated after a predefined time interval.

18. The RAN controller as claimed in claim 11, wherein the second handover process is executed when an indication for an A3 event from a UE positioned in the serving cell is identified.

19. The RAN controller as claimed in claim 11, wherein the second handover process is executed when a load of the serving cell is greater than at least one of a predefined threshold and a load of the neighbor cell from the plurality of candidate cells.

20. The RAN controller as claimed in claim 11, wherein the first handover process further comprising:
   transmitting an input to the second handover process for ending the receiving of the plurality of cell parameters from the E2 nodes,
   wherein the plurality of cell parameters includes at least one of: reference signal received power (RSRP) and reference signal received quality (RSRQ) for each of the plurality of candidate cells.

\* \* \* \* \*